C. J. COLEMAN.
BATTERY FILLING MACHINE.
APPLICATION FILED MAR. 29, 1907.

925,300.

Patented June 15, 1909.
7 SHEETS—SHEET 1.

Witnesses:
Bernard Cowen
Wm. Ashley Kelley

Inventor:
Clyde J. Coleman
by Henry D. Williams
Atty.

C. J. COLEMAN.
BATTERY FILLING MACHINE.
APPLICATION FILED MAR. 29, 1907.

925,300.

Patented June 15, 1909.
7 SHEETS—SHEET 2.

Witnesses:
Bernard Cowen
Wm. Ashley Kelly

Inventor:
Clyde J. Coleman
by Henry D. Williams
Atty.

C. J. COLEMAN.
BATTERY FILLING MACHINE.
APPLICATION FILED MAR. 29, 1907.

925,300.

Patented June 15, 1909.
7 SHEETS—SHEET 3.

Witnesses:

Inventor:
Clyde J. Coleman
by Henry D. Williams
Atty.

C. J. COLEMAN.
BATTERY FILLING MACHINE.
APPLICATION FILED MAR. 29, 1907.

925,300.

Patented June 15, 1909.
7 SHEETS—SHEET 5.

Witnesses:

Inventor:
Clyde J. Coleman
by Henry D. Williams
Atty.

C. J. COLEMAN.
BATTERY FILLING MACHINE.
APPLICATION FILED MAR. 29, 1907.

925,300.

Patented June 15, 1909.
7 SHEETS—SHEET 6.

Witnesses:

Inventor:
Clyde J. Coleman
by Henry D. Williams
Atty.

UNITED STATES PATENT OFFICE.

CLYDE J. COLEMAN, OF NEW YORK, N. Y., ASSIGNOR TO CONRAD HUBERT, OF NEW YORK, N. Y.

BATTERY-FILLING MACHINE.

No. 925,300.      Specification of Letters Patent.      Patented June 15, 1909.

Application filed March 29, 1907. Serial No. 365,397.

*To all whom it may concern:*

Be it known that I, CLYDE J. COLEMAN, a citizen of the United States, residing in the borough of Manhattan, city of New York, in the county of New York and State of New York, have invented a certain new and useful Improvement in Battery-Filling Machines, of which the following is a specification, reference being had therein to the accompanying drawings, forming a part thereof.

The present invention relates particularly to the operation of introducing the dry or damp pulverulent or granular electrolyte or filling material into the cells of so-called dry batteries, and of introducing the carbon or other element and packing the filling material around it, and the object of the invention is to produce a machine to perform this operation in an expeditious and uniform manner, the machine preferably being partly or wholly automatic in its operation.

I will now describe the construction shown in the accompanying drawings embodying my invention, and will thereafter point out my invention in claims.

The illustrated embodiment of the invention comprises as its operating instrumentalities, mechanism for feeding and positioning the cells to be filled, a chute for introducing the filling material into the cells, feeding devices for supplying the material to the chute, and a packing device for packing the material in the cells.

The empty cells 1 are placed on a rotary table 2 (Fig. 2) by the operator, being positioned thereon by clamp blocks 3 rigidly connected with the table. A clamp wheel 4 coöperates with the table, so that as the cells are brought to the filling position by the rotation of the table they are engaged by clamp blocks 5 on the clamp wheel and thereby firmly and accurately held in position to be filled. In this position the cell is engaged by a filling chute 6, which is slidingly connected with a tube 7 connected with a horizontal tube 8 communicating with a hopper 9 in which a supply of filling material is maintained. An agitator 10 keeps the material in the hopper in a fluent condition during the filling operation, and a worm conveyer 11 in the bottom of the hopper forces a stream of material into the tube 7.

Figures 4, 7:
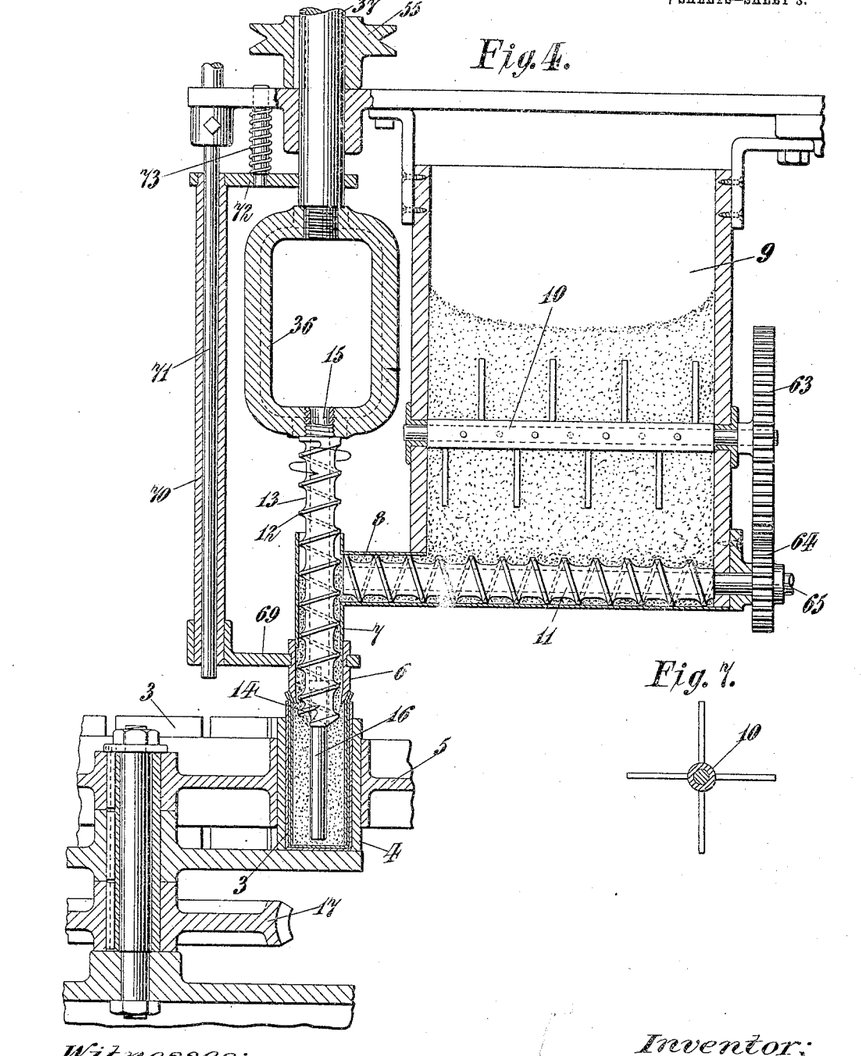
Fig. 4 is a vertical median section of a portion of the machine, showing particularly the parts directly concerned in the filling operation.
Fig. 7 is a transverse section of the agitator.
Figure 8:
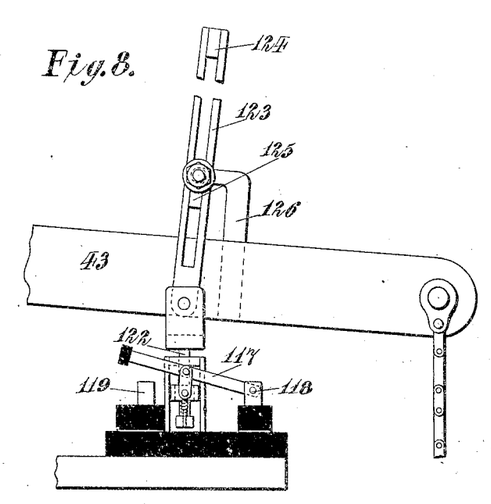
Fig. 8 is a side elevation of the stop switch for the lifting mechanism.
Figure 9:
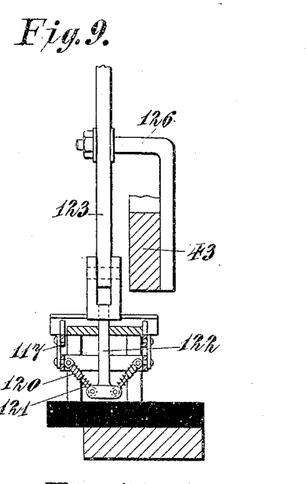
Fig. 9 is a sectional view of the same.

The packing device 12 is a rod provided with a helical groove 13 giving it the form of a screw, so that by the rotation of the device the filling material may be forced through the chute and into the cell. By this action the material is not only introduced into the cell but is also firmly and uniformly packed therein. The packing device is provided with a lip 14 dividing the lower end of the groove and facilitating the packing operation. A passage 15 is provided through the center of the packing device to permit the introduction by the operator of the carbon or other element of the cell. This element 16 (Fig. 4) is thus located in the center of the cell and the material is packed around it. At the beginning of the filling operation the packing device is lowered to the bottom of the cell, but as the filling proceeds it is raised upon the material beneath it, being free to rise for this purpose, and when the cell has been filled to the proper extent, as gaged by the vertical position of the packing device, the operation automatically ceases and the cell is removed from the chute and an empty cell substituted. The mechanisms by which these operating instrumentalities are actuated will now be described.

Figures 2, 3:
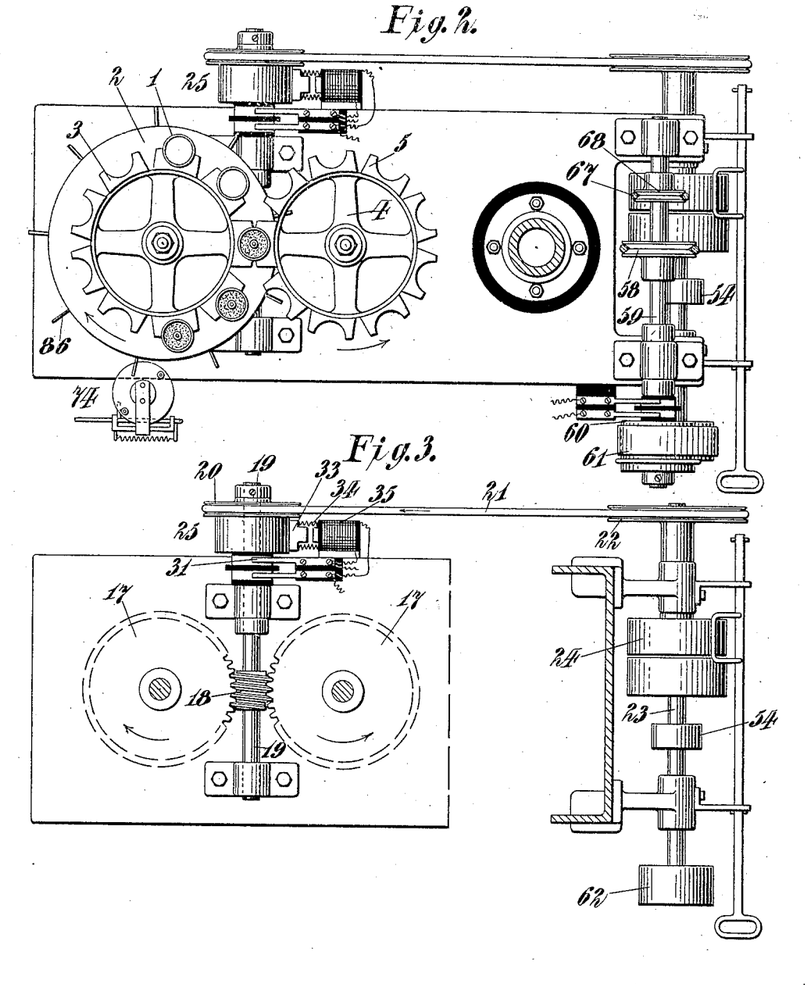
Fig. 2 is a horizontal section on the line 2—2, Fig. 1.
Fig. 3 is a horizontal section on the line 3—3, Fig. 1.
Figure 20:
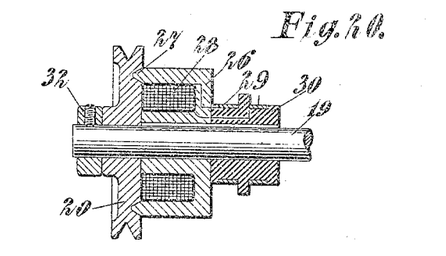
Fig. 20 is a sectional view of the table-driving clutch.

The table and the clamp wheel are fixed to worm wheels 17, which are engaged by a worm 18 on a horizontal shaft 19 journaled on the frame of the machine. A pulley 20 is loosely journaled on the shaft and is connected by a belt 21 with a pulley 22 fixed on a power shaft 23. The power shaft is rotated constantly by a pulley 24 and belt connections with a suitable source of power. The pulley 20 normally rotates freely on the shaft 19, but it forms one member of an electric clutch, so that it may be caused to rotate the shaft at such times in the operation of the machine as it is necessary to rotate the table to feed an empty cell into position to be filled. This clutch, which will, for convenience, be hereinafter called the "table clutch", is indicated generally in the drawings by the reference character 25, and its construction is shown in Fig. 20. As there shown, a cupped cylindrical iron clutch member 26 is fixed to the shaft 19 and provided with a solenoid 28 by which it may be magnetized upon the passage of an electric current. The clutch member 26 is provided with an annular beveled engaging surface 27 which coöperates with a corresponding groove in the pulley 20. The pulley is made of soft iron so as to be attracted by the fixed clutch member when the latter is magnetized, and thus the clutch surfaces are held in frictional contact and the shaft 19 is rotated as long as the current flows through the solenoid. The pulley is free to move longitudinally on the shaft enough to free itself from contact with the fixed clutch member when the latter is demagnetized, and such longitudinal movement is limited by a collar 32 fixed to the shaft. The solenoid is connected with two contact rings 29 mounted on an insulating bushing 30 on the shaft, and two contact springs 31 connect the contact rings with the external circuit (Fig. 3). An electric brake is provided to stop the table-actuating mechanism promptly upon the interruption of the current. This brake comprises a brake shoe 33 of soft iron which is normally pressed against the clutch member 26 by springs 34. An electro magnet 35, energized by the same circuit as the clutch, acts to hold the brake shoe away from the clutch while the current is flowing, but releases it immediately upon the interruption of the current and the release of the clutch.

The packing device 12 is fixed to a yoke 36—provided to facilitate the introduction of the carbons—and the yoke is fixed to a shaft 37 which rotates and slides vertically in brackets 38 and 39 on the frame of the machine. A weight 40 on the upper end of the shaft acts to depress the shaft and the packing device when released by the lifting mechanism, and it serves also to determine the density with which the filling material is packed in the cell.

Figures 15, 16, 17:
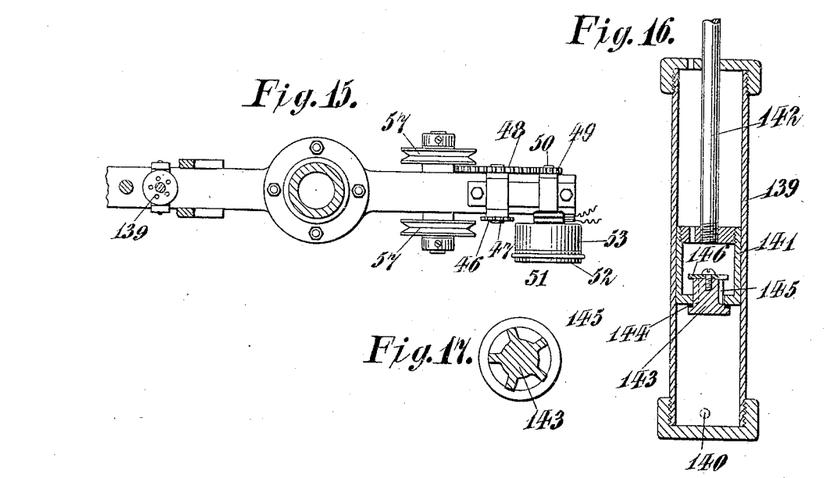
Fig. 15 is a detail plan view of a portion of the machine showing particularly the lifting-lever-actuating mechanism.
Fig. 16 is a vertical section of the lifting-lever check device.
Fig. 17 is a horizontal sectional detail view of the valve in the lifting-lever check device.

The mechanism for lifting the packing device from the cell at the end of the filling operation comprises a lever 43, hereinafter called the "lifting lever", which is pivotally connected, at its forked end 42, with a collar 41 loosely journaled on the shaft 37. The lifting lever is pivoted at 44 on the frame of the machine, and is connected at its rear end with a chain 45 attached to a sprocket wheel 46. The sprocket wheel (Fig. 15) is connected, by a shaft 47 journaled on the frame of the machine, with a gear 48 meshing with a pinion 49 fixed to a shaft 50. On the other end of the shaft 50 is a normally-free pulley forming part of an electric clutch 51 analogous in construction and operation to the table clutch, except that in this case the magnetic member is free on the shaft and the grooved member 52 is fixed. A belt 53 connects the clutch with a pulley 54 on the power shaft 23. When the clutch is thrown into operation by the passage of an electric current the mechanism just described operates to swing the lifting lever and lift the packing device.

Figures 1, 5, 6:
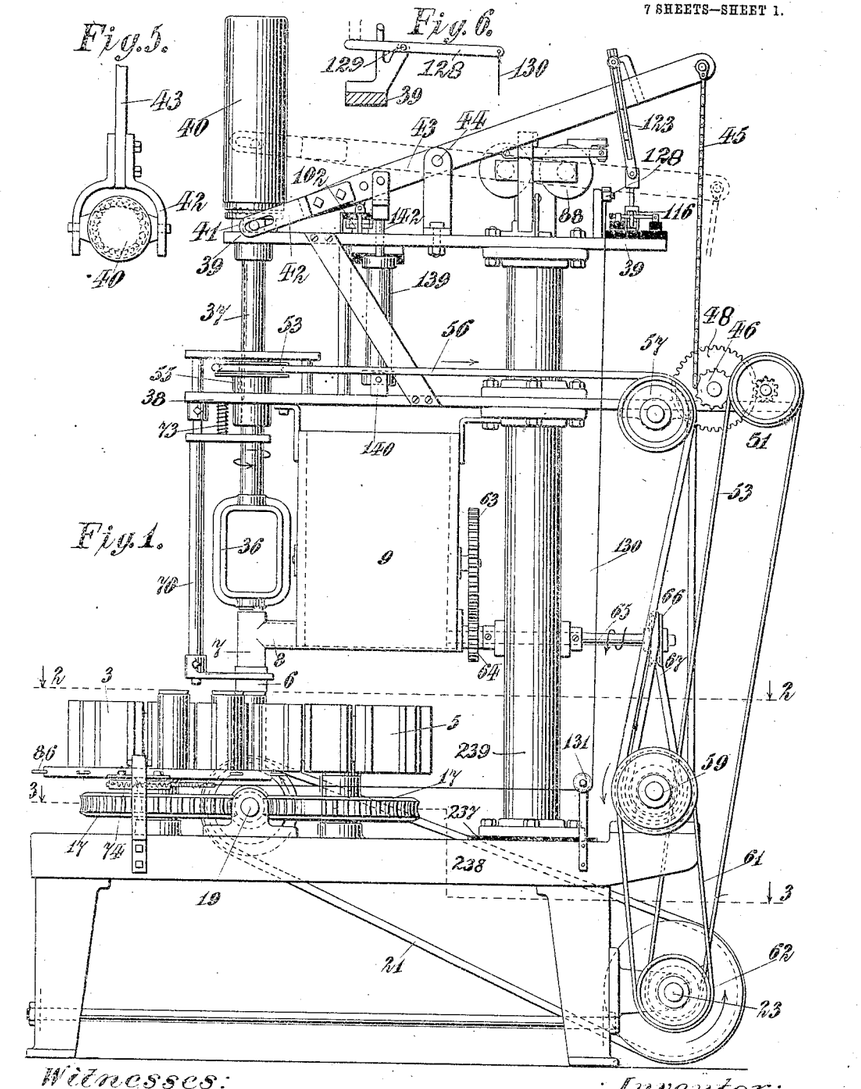
Figure 1 is a side elevation of the entire machine.
Fig. 5 is a detail plan view of the connection between the lifting lever and the packing-device shaft.
Fig. 6 is a detail front elevation of the actuating lever for the table switch.

To prevent the too-forcible descent of the weight and the packing device, a check is attached to the lifting lever. This check comprises a cylinder 139 (Figs. 1 and 16) pivoted at 140 on the frame of the machine, and containing a piston 141 connected, by a piston rod 142, with the lifting lever. A check valve 143, controlling a vent in the piston, is provided with a valve surface 144 to prevent the upward passage of the air or other fluid in the cylinder, but is grooved at 145 to permit the downward passage of the fluid, so that the device retards the downward movement of the lever without interfering with its upward movement.

To rotate the packing device a pulley 55 is splined to the shaft 37 and is connected, by a belt 56 passing over idler-pulleys 57, with a pulley 58 (Fig. 2) fixed to a counter-shaft 59 journaled on the frame of the machine. The counter-shaft is provided with an electric clutch 60 similar in construction and operation to the lifting clutch above described, and a belt 61 connects the clutch with a pulley 62 on the power shaft.

The agitator 10 and the conveyer 11 are connected by gears 63 and 64, and the shaft 65 of the conveyer is provided with a pulley 66 connected, by a belt 67, with a pulley 68 on the counter-shaft, so that whenever rotation is imparted to the packing device the feeding devices are actuated in unison therewith.

The chute 8 receives its vertical movements from the packing-device-actuating mechanism. It is carried by an arm 69 fixed to a sleeve 70, which slides vertically on a guide rod 71 fixed on the bracket 38. When the packing device is lifted the yoke 36 engages an arm 72 on the upper end of the sleeve 70 and lifts the chute clear of the cell, but when the packing device is lowered into operative position the chute is allowed to fall, and is pressed down against the top of the cell by a spring 73 engaging the arm 72, and thus spilling of the filling material over the top of the cell is prevented. The packing device makes a sufficiently close fit with the chute to prevent the filling material from flowing from the chute and spilling during the substitution of an empty cell for the filled cell.

Figures 10, 11, 12:
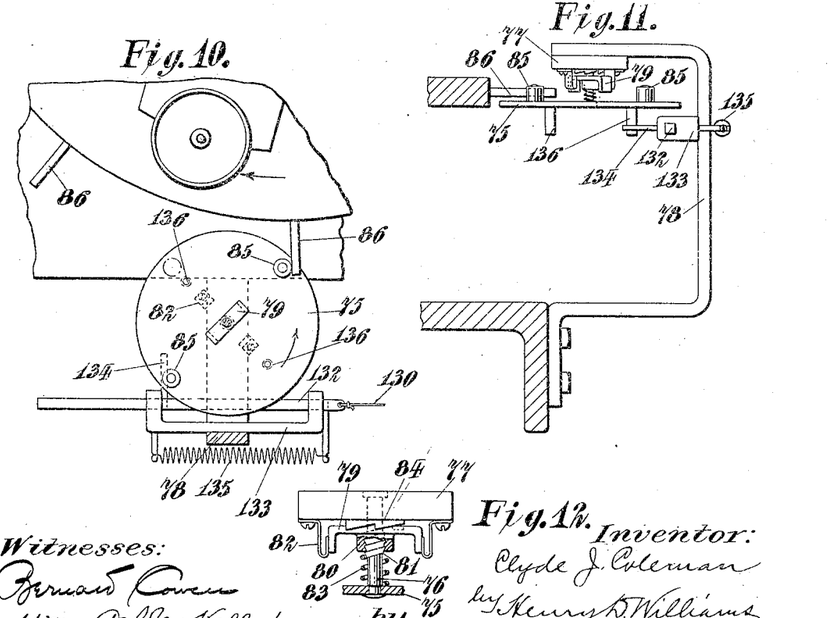
Fig. 10 is a horizontal sectional view of the table switch.
Fig. 11 is a front elevation of the same.
Fig. 12 is a detail view, partly in section, of a portion of the table switch.
Figures 13, 14:
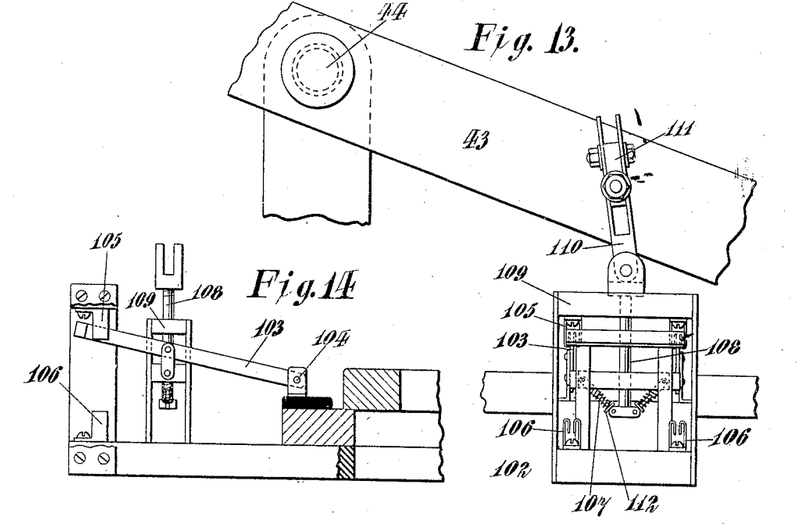
Fig. 13 is a side elevation, from the direction opposite to that of Fig. 1, of the feed-controlling switch.
Fig. 14 is a front elevation, partly in section, of the same.
Figure 18:
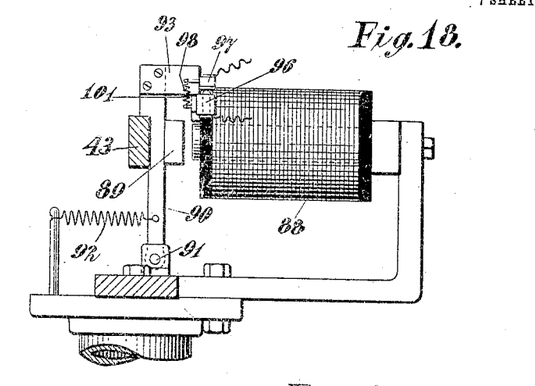
Fig. 18 is a rear elevation of the lifting-lever detent mechanism.
Figure 19:
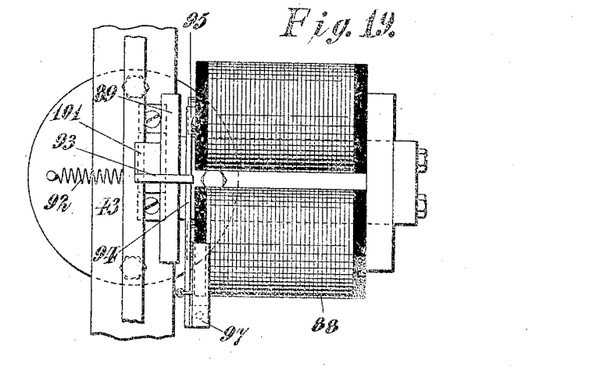
Fig. 19 is a plan view of the same.
Figure 21:
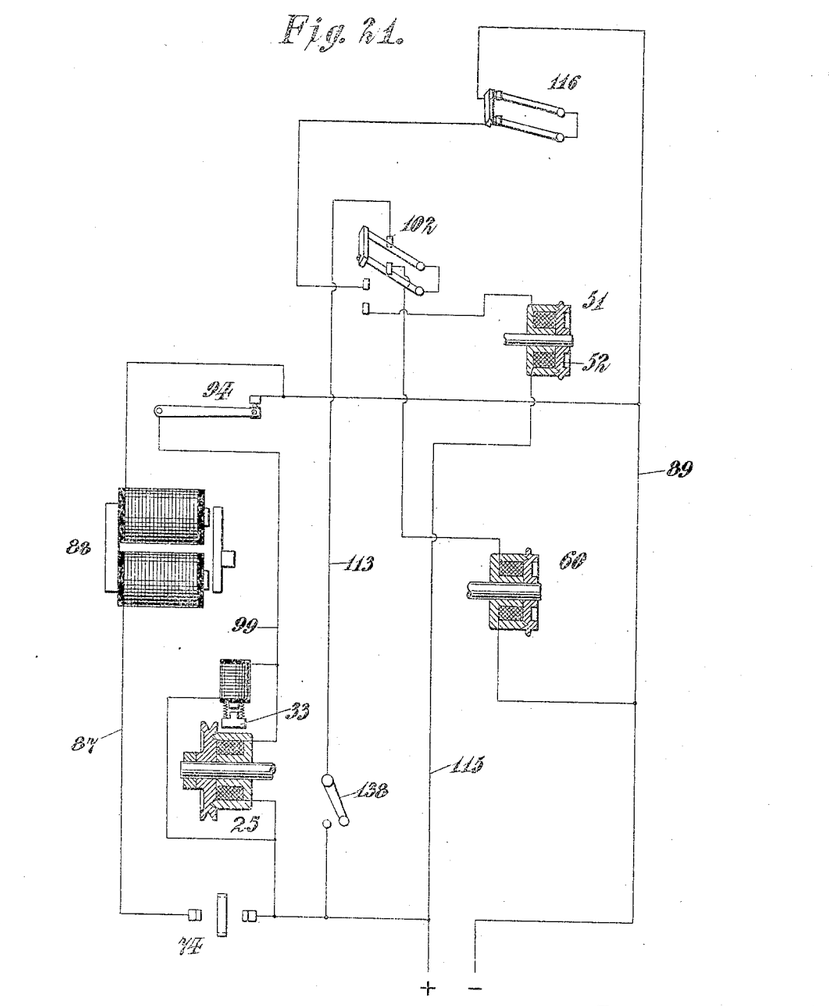
Fig. 21 is a diagram of the electrical connections.

It remains to describe the electric switches and circuits by which the operation of the electric clutches is controlled. A rotary snap switch 74, which may be called the "table switch", is located beside the table 2 and actuated thereby. This switch comprises a disk 75 (Fig. 10) fixed to a stem 76 which is journaled in a block 77 of insulating material. The block is mounted on a bracket 78 on the frame of the machine. A contact member 79 journaled on the stem is provided with a hub 80 having a screw thread engagement with a threaded portion 81 of the stem. This contact member is adapted to contact with fixed contacts 82 on the block 77. A spring 83 is attached at one end to the contact member and at the other end to the stem. A ratchet 84 provided with four teeth engages the contact piece 79 and prevents it from rotating with the stem 76 until it is depressed below the teeth of the ratchet. When the disk 75 is rotated through a quarter-turn the spring 83 is twisted, during the first part of this movement, the contact piece being held from rotation by the ratchet, but the screw threads act to draw the contact piece down, so that before the movement of the disk is completed the contact piece is released from the ratchet and is quickly snapped into or out of contact with the fixed contacts. This switch is actuated by pins 85 on the disk 75, these pins being engaged by pins 86 arranged on the table at such points that at the latter part of a cell-feeding movement the switch is actuated and thrown into closed position, so as to close the circuit through the switch. This circuit passes, as shown in Fig. 21, from the source of electricity through a wire 87, through the solenoids of a magnet 88, and thence to the common return wire 89 of the system. The magnet 88 forms part of a switch and detent mechanism shown particularly in Figs. 18 and 19. The magnet is mounted on the frame of the machine and has an armature 89 mounted on an arm 90 pivoted at 91 to the frame. A spring 92 tends to hold the armature away from the magnet. A switch arm 94 is pivoted on the magnet at 95 and has a contact member 96 normally held in engagement with a fixed contact 97 by a spring 98. A lug 93 on the arm 90 engages and depresses the switch when the armature is attracted by the magnet. As shown in Fig. 21, the switch 94 is in circuit, through a wire 99, with the table clutch 25 and its brake, so that when the table switch is moved to closed position by the pin 86 on the table, as above described, the magnet 88 is energized, the switch 94 is opened, and the table clutch and brake are released, thereby stopping the rotation of the table, and this operation is timed to occur at the moment when a cell has been fed into proper position beneath the chute. The armature 89 has the further function of releasing the lifting lever at this time to permit the packing device to descend into the cell. A detent 101 on the arm 90 engages the rear portion of the lifting lever when the forward end is raised, to hold the packing device in raised position during the cell-feeding operation. When the magnet 88 is energized as above described the lifting lever is released, and the packing device descends. The lifting lever, by the descent of its forward end, actuates a switch 102 by which the material-feeding devices and the packing device are thrown into operation. This switch, as shown in Figs. 13 and 14, is of the snap-action knife type. It comprises contact blades 103 pivotally mounted at 104 and adapted to engage contact springs 105 and 106 alternatively. The blades are connected by sliding links 107 with a plunger 108 sliding vertically in a frame 109. The plunger is connected, by a link 110, with the forward part of the lifting lever, an adjustable connection 111 being provided. When the lever descends the plunger operates the links 107 toggle-fashion, and thus compresses springs 112 which surround the links, until the links have been depressed slightly below their straight-line central position, whereupon the springs quickly expand and throw the switch blades into their upper position, as in Fig. 13, and the blades engage the contact springs 105. This operation closes the circuit through the counter-shaft clutch 60, as shown in Fig. 21, and thereby throws the material-feeding devices and the packing device into operation. During the filling operation the packing device gradually rises, as before described, and when it has risen sufficiently the lifting lever throws the switch 102 in the opposite direction, the parts being adjusted to accomplish this at the moment when the cell has been filled to the requisite degree. This interrupts the operation of the feeding devices and the packing device, and the switch closes the circuit through the wire 115, the lifting clutch 51, and the switch contacts 106, and the lifting-lever-actuating mechanism operates to lift the packing device out of operative position.

A second switch 116 is interposed in the lifting-clutch circuit for the purpose of interrupting the operation of the lifting mechanism when the packing device has been raised to its uppermost position. This switch is similar in character to the switch 102, but has only one pair of contact springs, 119. The blades 117 are pivoted at 118 and connected, by links 120 and springs 121, with a plunger 122 pivotally connected with a link 123. An arm 126 on the lifting lever engages a slot in the link, and when the lever reaches its lowermost position the arm strikes a block 125 in the slot and throws the switch, thereby interrupting the circuit and stopping the lifting mechanism. In order to start the table automatically into rotation again at this time, to remove the filled cell and substitute an empty cell, the lifting lever is connected with the table switch so as to open it and release the switch 94 and the lever detent. A lever 128 (Fig. 6) is pivoted at 129 on the frame of the machine in position to be engaged by the lifting lever at the end of its lifting movement, and this lever is connected, by a cord 130 passing around an idler pulley 131, with a slide 132 (Fig. 10) moving in a guide 133 on the bracket 78. A spring 135 normally keeps the slide in its left-hand position, but through the connections described the slide is moved to the right, and an arm 134 on the slide engages one of two pins 136 on the bottom of the disk 75 and rotates the disk through a quarter-turn, thereby throwing the switch and starting the table. The cycle of operations above described is then repeated indefinitely.

It is important to prevent short-circuiting of the battery during the filling operation, and for this purpose insulating material 237 (Fig. 1) is interposed between the bed-plate 238 on which the cell-holding mechanism is mounted, and the column 239 which supports the filling mechanism, and by this arrangement the metallic portions of the machine in electrical contact with the two elements of the cell are insulated from each other.

It will be seen that the operations of the machine follow each other in a perfectly automatic manner, the assistance of the operator being necessary only in handling the cells and in inserting the carbons at the proper time. In order to cause the machine to stop momentarily to permit the operator to insert the carbon a hand switch 138 is interposed in the circuit of the counter-shaft clutch. This switch is normally open, so that after the packing device has descended into the empty cell it does not begin to rotate and to fill the cell until the operator has inserted the carbon and closed the hand switch.

The invention has been shown as embodied in a machine for filling batteries of a certain form, but it will be apparent that it may be adapted to fill batteries of other forms, and while the machine is preferably made automatic in its operation, this is not an essential feature of the invention in its broadest aspects.

It is obvious that various modifications may be made in the construction shown and above particularly described within the principle and scope of my invention.

I claim:

1. A battery-filling machine having, in combination, a chute engaging and terminating substantially at the mouth of a cell for directing the filling material into the cell, a packing device movable longitudinally with respect to the chute and acting to project beyond the chute and enter the cell and to retreat gradually as the cell is filled and means for moving the chute to engage and disengage the cell.

2. A battery-filling machine having, in combination, a chute engaging and terminating substantially at the mouth of a cell to direct the filling material into the cell, a packing device consisting of a rotating screw longitudinally movable with respect to the chute and acting to project beyond the chute and enter the cell longitudinally and to retreat gradually into the chute as the cell is filled and means for moving the chute to engage and disengage the cell.

3. A battery-filling machine having, in combination, a chute to direct the filling material into a cell, a packing device located in the chute, and mechanism operating automatically to position an empty cell and hold it stationary beneath the chute, introduce the packing device by a vertical movement thereof into the cell and actuate it therein to fill the cell, and then remove the packing device from the cell to permit the removal of the cell.

4. A battery-filling machine having, in combination, a chute to direct the filling material into a cell, a screw-formed packing device located in the chute, and mechanism operating automatically to position an empty cell and hold it stationary beneath the chute, introduce the packing device longitudinally into the cell and rotate it therein, and then remove the packing device from the cell to permit the removal of the cell.

5. A battery-filling machine having, in combination, means for feeding filling material into a cell, a packing device operating to enter the cell and pack the material therein and to retreat gradually as the cell is filled, and mechanism operating automatically, when the packing device has retreated to a predetermined point, to interrupt the filling operation and withdraw the packing device from the cell.

6. A battery-filling machine having, in combination, means for filling a cell and means for positioning and holding the cell comprising a rotary table provided with a clamp block for engaging the cell laterally, and means coöperating with the clamp block to clamp the cell when it is in position to be filled.

7. A battery-filling machine having, in combination, means for filling a cell and means for positioning and holding the cell comprising two rotary members provided with coöperating clamp blocks operating to engage and clamp the cell when it is in position to be filled.

8. A battery-filling machine having, in combination, means for filling a cell and for engaging and relatively locating the elements thereof, the members engaging the respective elements being insulated from each other to prevent short-circuiting of the cell.

In testimony whereof I have affixed my signature in presence of two witnesses.

CLYDE J. COLEMAN.

Witnesses:
 BERNARD COWEN,
 WM. ASHLEY KELLY.